(12) United States Patent
Hasegawa

(10) Patent No.: US 8,302,800 B2
(45) Date of Patent: Nov. 6, 2012

(54) PROTECTIVE DEVICE FOR A PRESSURE COOKER AND PRESSURE COOKER WITH A PROTECTIVE DEVICE

(76) Inventor: Tom Hiroshi Hasegawa, Gardena, CA (US)

( * ) Notice: Subject to any disclaimer, the term of this patent is extended or adjusted under 35 U.S.C. 154(b) by 301 days.

(21) Appl. No.: 12/798,286

(22) Filed: Apr. 1, 2010

(65) Prior Publication Data

US 2010/0193521 A1  Aug. 5, 2010

Related U.S. Application Data

(63) Continuation-in-part of application No. 10/741,744, filed on Dec. 19, 2003, now Pat. No. 7,726,508, which is a continuation-in-part of application No. 10/334,083, filed on Dec. 30, 2002, now abandoned.

(51) Int. Cl.
*B65D 51/16* (2006.01)

(52) U.S. Cl. ......... 220/372; 220/373; 220/912; 220/731

(58) Field of Classification Search .................. 220/316, 220/370–373, 731, 912; 210/499; 55/505
See application file for complete search history.

(56) References Cited

U.S. PATENT DOCUMENTS 2,494,679 A * 1/1950 Ward, Jr. .................. 220/372
3,245,540 A * 4/1966 Johnson .................. 210/291

* cited by examiner

*Primary Examiner* — Anthony Stashick
*Assistant Examiner* — James N Smalley
(74) *Attorney, Agent, or Firm* — DLA Piper LLP (US)

(57) ABSTRACT

A protective device attached to a pressure release valve of a lid of a pressure cooker, including a dome-shaped mesh casing body, a ring-shaped reinforcing frame fixed to the upper edge of the mesh casing body, a bridge plate provided on the reinforcing frame with both ends thereof fixed to the reinforcing frame so that the bridge plate diametrically crosses the ring-shaped reinforcing frame keeping distance from the bottom of the mesh casing body, and an attachment member of substantially a hollow cylinder provided at the center of the bridge plate.

9 Claims, 8 Drawing Sheets

PROTECTIVE DEVICE FOR A PRESSURE COOKER AND PRESSURE COOKER WITH A PROTECTIVE DEVICE

BACKGROUND OF THE INVENTION

1. Field of the Invention

The present invention relates to a protective device or a safety cap that covers and protects the pressure release valve of a pressure cooker and to a pressure cooker installed with such a protective device.

2. Prior Art

A pressure cooker is a cooking utensil (pot) that utilizes high-temperature and high-pressure steam to cook food inside the pot. The pot and its lid are designed to create an airtight space inside the pot. When the pot is heated, the air inside expands. The expanding air inside the pot is unable to escape, so the atmospheric pressure within the pot increases. As the atmospheric pressure increases, the boiling point of water also increases. Thus, a pressure cooker enables the water or moisture inside the pot to become hotter than it would under the normal atmospheric pressure.

With a conventional cooking pot, the water inside a pot turns into steam at around 100° C. (212° F.). The steam freely escapes the pot, leaving the atmospheric pressure within the pot close to normal and the temperature close to 100°. Consequently, a large portion of the heating energy applied to the pot is wasted in warming the surrounding air.

In addition to creating a high-pressure environment within a pot, a pressure cooker also makes the water in a pot, in addition to the moisture within food, hotter than 100° C. and this impacts cooking in three ways. First, food cooks much faster in a high-pressure and high-temperature environment and requires far less cooking or heating time. The cooking time is shortened to one-third or one-fourth of the time required for a conventional cooking pot. Second, the decreased cooking time and trapped steam results in greater energy efficiency. A pressure cooker generally requires only one-fourth to one-third of the energy of a conventional cooking pot. Third, high-temperature and high-pressure cooking significantly improves cooking in high altitudes and in cold climates.

Unfortunately, there is an omnipresent risk, which is explosion caused by too much pressure inside the pot. This risk is very real because a pressure cooker prohibits the free circulation of air between the interior and the exterior of the pot and cooks food under high-pressure and high-temperature conditions. Today's pressure cooker manufacturers alleviate this risk in many ways, including: using sturdier materials to construct pots; utilizing a timer to control the length of heating time; installing a pressure gauge to monitor the atmospheric pressure inside; and installing a pressure release valve, which is the most widely used method.

A pressure release valve is a device that is physically attached to a pressure cooker. Its function is to release the pressurized air in a pot when the atmospheric pressure within the pot exceeds a pre-set point. The valve is usually installed in the pressure cooker lid. The interior portion of the valve is shaped like a pipe, and it has a closed end surrounded by four or five air intake apertures of 1 mm to 2 mm in diameter. The exterior portion of the valve is an air release nozzle. This nozzle is kept closed by the pressure of a weight device or a spring mechanism. When the pressure of the air or steam coming into the valve becomes greater than the pressure that keeps the nozzle closed, the valve opens and releases the inside air, which reduces the atmospheric pressure inside the pressure cooker.

While this type of safety device is very widely used, it is flawed in two major ways. First, the air intake apertures are easily clogged. When this occurs, the expanding air inside the pot has no means of release and the atmospheric pressure rises, which significantly increases the risk of explosion. The air intake apertures may be clogged by foods while cooking or by inadequate cleaning.

Second, putting aside the safety function that the valve actually provides, the valve's exterior appearance does not give the user an adequate sense of safety in using the pressure cooker. When a user sees only four or five very small clog-prone apertures (the number and size of the apertures vary according to size and type of the pressure cooker), he or she may feel more anxious than assured of the valve's safety. So as to increase this insecurity, the owner's manual accompanying the pressure cooker, in addition to other literature, repeatedly warn users about the importance of proper maintenance of the valve. While many consumers may realize the merits of a pressure cooker, unfortunately, they largely remain potential users.

SUMMARY OF THE INVENTION

The two objectives of the present invention are to provide a significantly safer pressure cooker by protecting the pressure release valve so that it will not clog, thereby preventing explosions caused by clogging, and to eliminate a user's insecurity regarding the proper functioning of the pressure release valve.

The basic idea of the present invention is to prevent food particles from reaching the pressure release valve during cooking, so that air passage or air intake apertures of the pressure release valve is prevented from clogging.

The objectives are accomplished by an innovative and unique device specifically designed for a pressure cooker, which protects air passage or air intake apertures and prevent clogging.

More specifically, a mesh-like or perforated surface structure (hereinafter referred to as "safety cap") is installed around the pressure release valve of a pressure cooker. The safety cap has numerous holes or openings that are slightly smaller or equal to the size of the air passage or air intake apertures of the pressure release valve of the cooker's lid. During cooking, the hot air or pressure inside the pressure cooker is allowed to escape when it is appropriate, while the safety cap prevents food particles that may clog the air intake apertures of a pressure release valve from passing through the safety cap. The sheer number of the holes and the size of those holes of the safety cap greatly improves the means by which steam may escape while preventing food from reaching the air intake apertures entirely, thus protecting the pressure release valve so that it may serve its safety function.

DETAILED DESCRIPTION OF THE INVENTION

The safety cap of the present invention (See FIG. 1) is used in an ordinary pressure cooker 10 that includes a pot 12, a lid 14 and a pressure regulator or pressure release valve 16 that releases the pressure (heated or hot air) inside the pot 12 during cooking. The pressure release valve 16 is provided at the center of the lid 14 and has a pressure release passage (not shown) therein.

Figure 1:
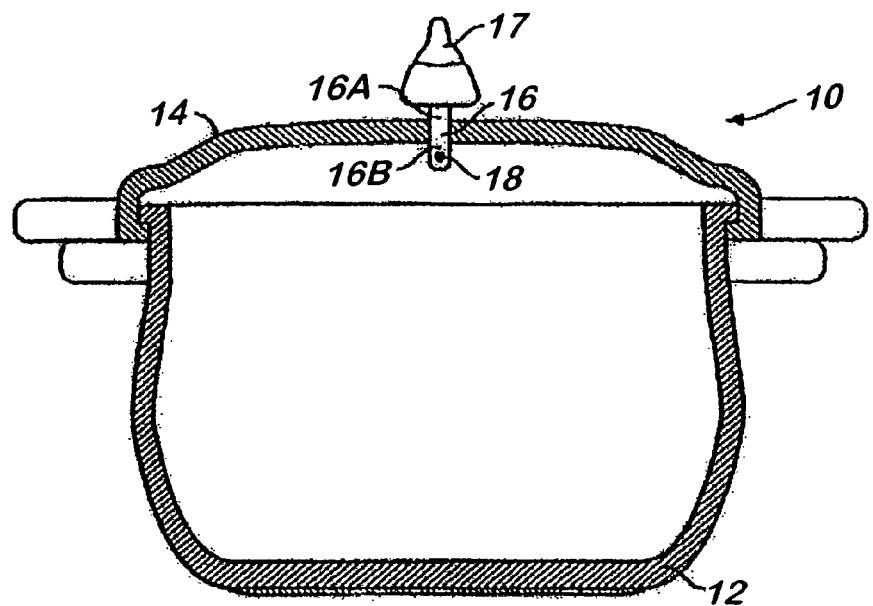
FIG. 1 illustrates a pressure cooker to which the present invention is applied.

More specifically, the pressure release valve 16 comprises an upper portion 16A, which is exposed outside the lid 14 and has a pressure regulation weight 17, and a lower portion 16B, which is located under the lid 14 and is covered by a safety cap 20 described below. The lower portion 16B of the pressure release valve 16 is formed with air intake apertures 18 (for instance, one aperture is opened in the lower end surface of the pressure release valve 16, and four apertures are opened in the peripheral area near the lower end of the pressure release valve 16; however, only one aperture is shown in FIG. 1). These air intake apertures 18 communicate with, via the pressure release passage (not shown), an air release nozzle (not shown) opened in the upper portion 16A of the pressure release valve 16. Thus, heated air or the pressure inside the pressure cooker 10 during cooking is released through the air intake apertures 18 and the pressure release aperture.

Figure 2:
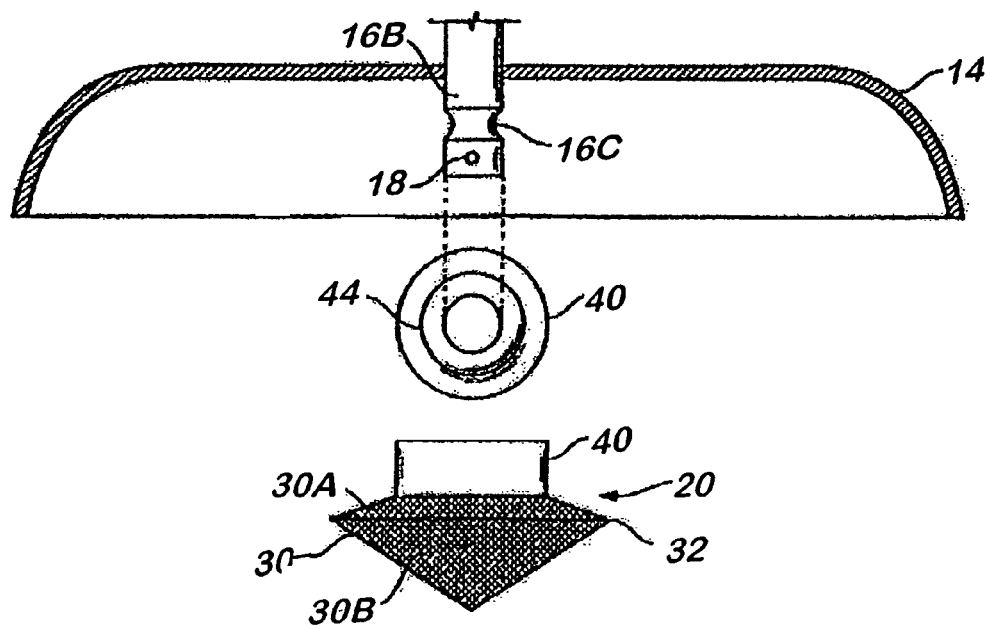
FIG. 2 shows in partial cross section how the snap-fit safety cap attaches using elastic material in the present invention.

As seen in FIG. 2, the safety cap 20 is comprised of a mesh casing body 30 with numerous openings and an attachment frame 40 that is fixed to the top of mesh casing body 30. The attachment frame 40 is located at the center of the top surface of the mesh casing body 30. The mesh casing body 30 and the attachment frame 40 are both made of heat resistant material such as metal (e.g. stainless steel) and/or heat-resistant plastics that can withstand the high-temperature and high-pressure inside the pressure cooker 10. They are also formed rigid to avoid deformation that may be caused by high heat and high pressure during cooking. Each of the openings in the mesh casing body 30 is equal to or smaller than the air intake apertures 18 of the pressure release valve 16.

The mesh casing body 30 is comprised of a shallow top section 30A, which is in a conical shape and a relatively deep main section 30B, which is in a reversed conical shape. The lower edge of the top section 30A and the upper edge of the main section 30B are connected and form the mesh casing body 30 with a circumferential ridge 32. The mesh casing body 30 has a diameter that is three times larger than that of the pressure release valve 16 of the pressure cooker 10. In addition, the depth or the height of the mesh casing body 30 is designed to be greater than the length of the lower portion 16B of the pressure release valve 16. As a result, when the safety cap 20 is set so that it covers the pressure release valve 16, there is a space between the inner surface of the mesh casing body 30 and the outer surface of the pressure release valve 16.

The attachment frame 40 of a shallow, hollow cylinder shape is provided with an elastic ring 44 in its interior. The inner diameter of the elastic ring 44 is the same as (or slightly smaller than) the outer diameter of the lower portion 16B of the pressure release valve 16 of the pressure cooker 10. The elastic ring 44 is made of elastic material and the rest of the attachment frame 40 is made of rubber or another heat resistant elastic material.

The safety cap 20 is attached to the pressure release valve 16 by pushing or sliding on the attachment frame 40 of the safety cap 20 to the lower portion 16B of the pressure release valve 16. The attachment frame 40 has the elastic ring 44 inside it, so that the attachment frame 40 fits on the lower portion 16B of the pressure release valve 16.

A circumferential groove 16C on the outer surface of the pressure release valve 16 ensures that the attachment frame 40 itself and the elastic ring 44 are snugly fitted in this groove 16C. The result is that the safety cap 20 is securely attached to the pressure release valve 16.

Great care should be taken when attaching the safety cap 20 to the pressure release valve 16. The attachment frame 40 (or the elastic ring 44) should not cover or close the pressure intake apertures 18 of the pressure release valve 16.

With the safety cap 20 attached to the pressure release valve 16, the mesh casing body 30 of the safety cap 20 catches fine food particles that may block the air intake apertures 18 during cooking. Thus, the air intake apertures 18 of the pressure release valve 16 are prevented from clogging by food particles. The surface area of the safety cap 20 is substantially greater than the lower portion 16B of the pressure release valve 16 and in particular, greater than the air intake apertures 18. Therefore, it is nearly impossible for all the openings of the safety cap 20 to be clogged entirely since cooking will normally be over before the entire surface of the safety cap 20 is covered by food particles. Because the safety cap 20 is rigid and because it covers the air intake apertures 18, the pressure release valve is prevented from clogging.

Figure 3:
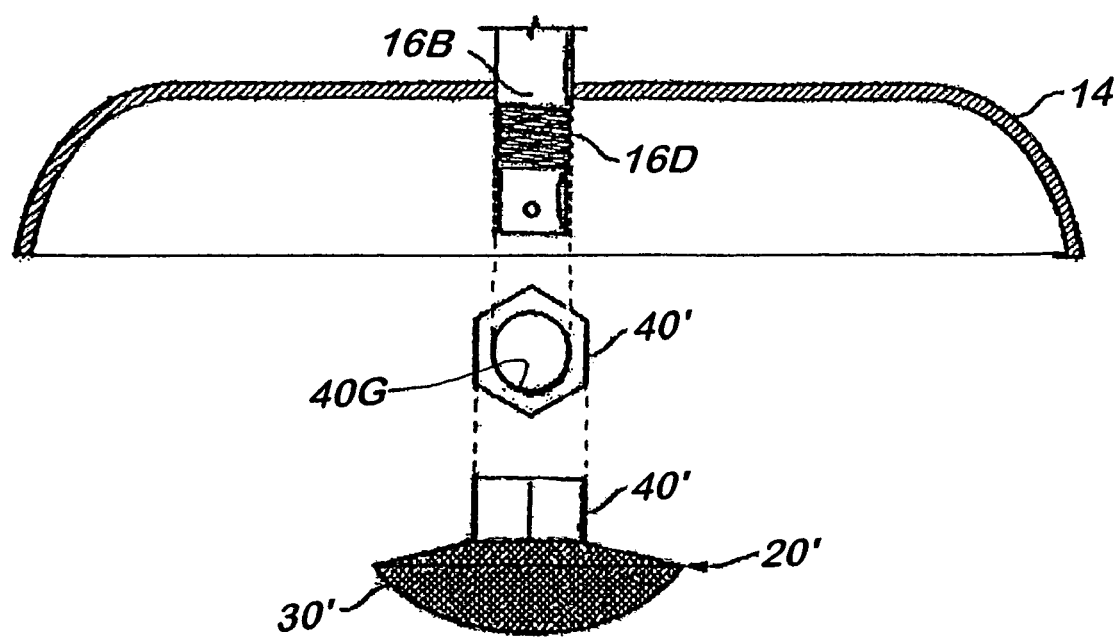
FIG. 3 shows in partial cross section how the screw safety cap attaches in the present invention.

The safety cap 20 can also be mounted on the pressure release valve by making the attachment frame 40' internally threaded at 40G, so that it is screw-engaged with a thread 16D formed on the external surface of the pressure release valve 16 as shown in FIG. 3.

By screwing the attachment frame 40' to the pressure release valve 16, the safety cap 20, like the safety cap 20 shown in FIG. 2, is attached to the pressure release valve 16 with a space between the external surface of the pressure release valve 16 and the inner surface of the safety cap 20', so that the pressure release valve 16 is not in contact with the safety cap 20' when the safety cap 20' is screwed to the pressure release valve 16.

Figure 4:
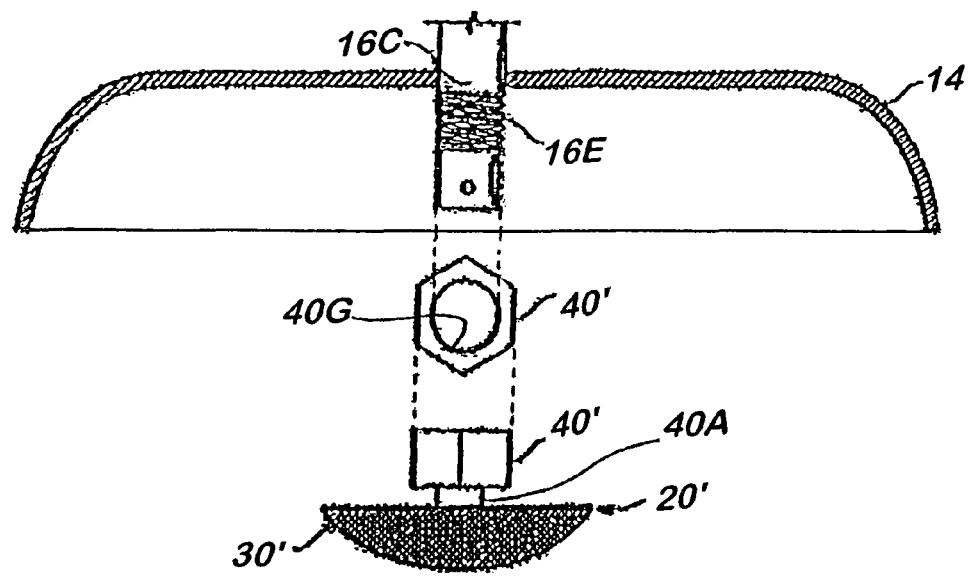
FIG. 4 shows in partial cross section how another type of screw safety cap attaches in the present invention.

In the above structure, the internally threaded attachment frame 40' is secured to the top section 30A of the mesh casing body 30. However, such an internally threaded attachment frame 40' can be secured, at a lower end of its shank portion 40A, to the bottom center of the main section 30B of the mesh casing body 30, which has no top section 30A, as shown in FIG. 4.

Figure 5:
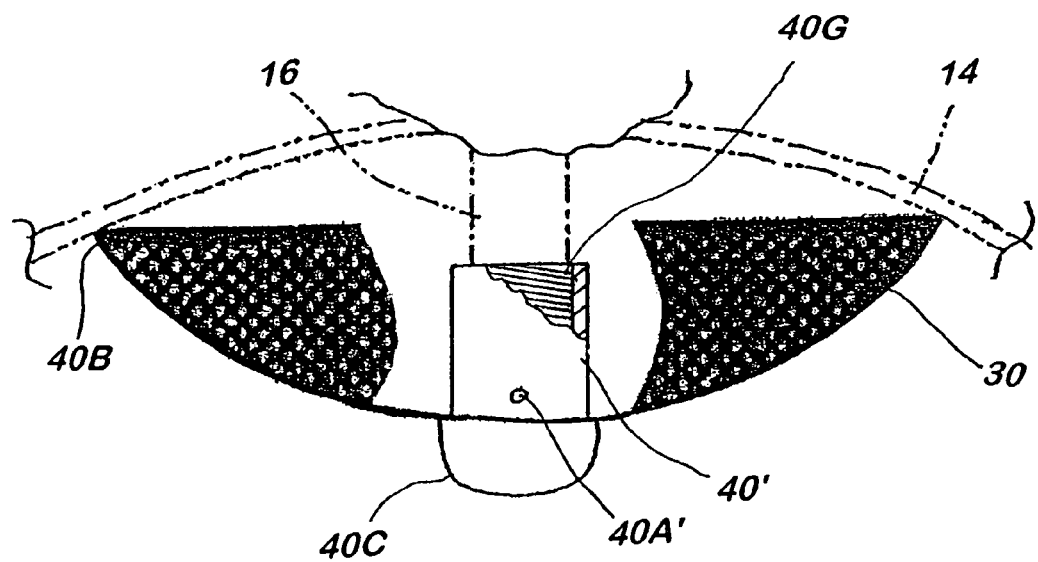
FIG. 5 is an enlarged partially cross sectional view of a still another type of screw safety cap of the present invention.
Figure 6:
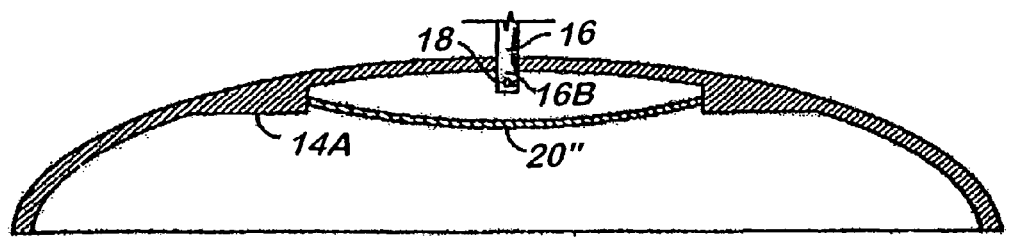
FIG. 6 shows in partial cross section how the safety cap attaches to the pressure cooker lid in the present invention.
Figure 7:
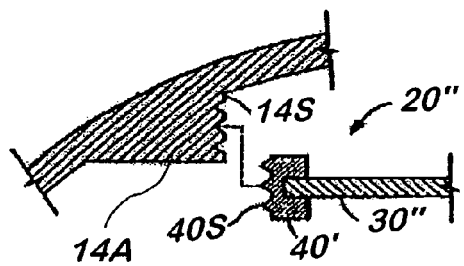
FIG. 7 shows in cross section the detail of how the screw safety cap attaches to the pressure cooker lid in the present invention.

Furthermore, an attachment frame 40' that is internally threaded at 40G and substantially a hollow cylinder with no shank portion can be secured to the mesh casing body 30 as shown in FIG. 5. In this structure, the safety cap is comprised of a mesh casing body 30 that is of a substantially shallow semi-sphere (dome) shape thus having a hollow interior and a curved outer surface and an attachment frame 40' that is secured to the bottom center of the mesh casing body 30. The internally threaded attachment frame 40' is formed with an air hole(s) 40A' that communicates with the interior of the pressure release valve 16 directly or via the air intake apertures (not shown) of the pressure release valve 16 when the mesh casing body 30 is screw-fastened to the pressure release valve 16.

In FIG. 5, the reference numeral 40B is a ring-shaped reinforcing frame that is fixed to the upper edge of the mesh casing body 30 and comes into contact with the inner surface of the lid 14 when the mesh casing body 30 is mounted to the pressure release valve 16. The reference numeral 40C in FIG. 5 is a knob that is used for securing the attachment frame 40' to the mesh casing body 30 and is also used when the mesh casing body 30 is fastened to the pressure release valve 16.

As in the same manner as the safety cap shown in FIG. 3, the safety cap comprising the mesh casing body 30 is attached to the lower portion 16B (see FIG. 3) of the pressure release valve 16 when the internally threaded attachment frame 40' is screwed to the thread 16D of the pressure release valve 16. Since the mesh casing body 30 has a curved (convex) outer surface, food particles less likely adhere to the mesh casing body 30. The air intake apertures of the pressure release valve 16 is thus prevented from clogging, assuring a smooth release of the pressure inside the pressure cooker during cooking.

Figure 8:
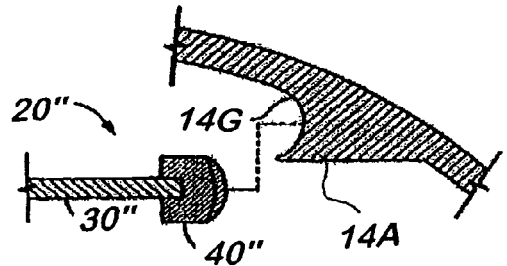
FIG. 8 shows in cross section the detail of how the snap-fit safety cap attaches to the pressure cooker lid in the present invention.
Figure 9:
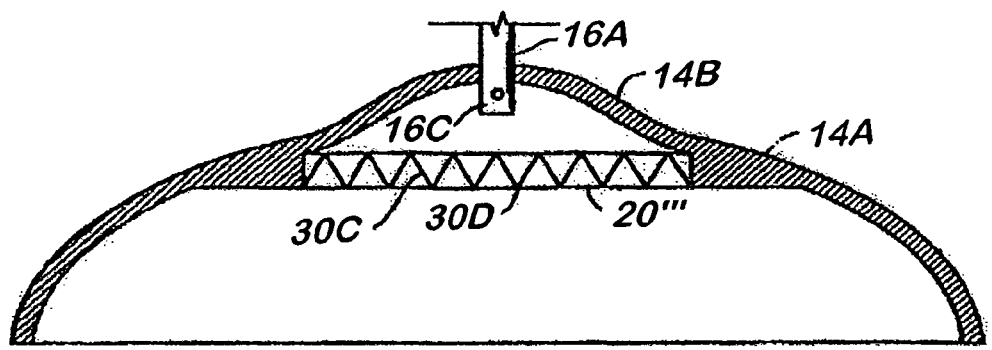
FIG. 9 shows in partial cross section how the screw safety cap with its wavy mesh casing body attaches to a specialized lid chamber in the present invention.

In the structures shown in FIGS. 8 and 9, the safety cap 20" (only a part of it is shown) is comprised of a circular attachment frame 40' and a mesh casing body 30" with its circumferential edge secured by the attachment frame 40'. The attachment frame 40' is formed on its outer circumferential surface, with an external screw thread 40s. The lid 14 of the pressure cooker is formed on its undersurface with a ring-shaped ridge 14A so that it surrounds the pressure release valve 16. The ring-shaped ridge 14A is formed on its inner circumferential surface with an internal screw thread 14s. The inner diameter of the ring-shaped ridge 14A of the lid 14 and the outer diameter of the attachment frame 40' are the same. The mesh casing body 30" has a convex shape, so it will not come in contact with the pressure release valve 16 when the safety cap 20" is attached to the lid 14.

With the structure described above, the safety cap 20" is attached to the under surface of the lid 14 by screwing the attachment frame 40' of the safety cap 20" to the ring shaped ridge 14A of the lid 14. The lower portion 16B of the pressure release valve 16 is covered by the safety cap 20", and the air intake apertures 18 of the pressure release valve 16 are prevented from clogging.

Instead of internal-thread 14s, in the structure shown in FIG. 8, the attachment frame 40" of the safety cap 20" is made of an elastic material. Attachment frame 40" has a curved outer circumferential surface, and an internal circumferential groove 14G which holds the curved outer circumferential surface of the attachment frame 40" is formed in the internal lower edge area of the ring-shaped ridge 14A of the lid 14. Attachment frame 40" fits snugly into the internal lower edge area of the ring-shaped ridge 14A of the lid 14. The attachment frame 40" of the safety cap 20" that includes the mesh casing body 30" has an outer diameter that is the same as the inner diameter of the circumferential groove 14G of the ring-shaped ridge 14A of the lid 14.

By pushing the attachment frame 40" into the circumferential groove 14G of the ring-shaped ridge 14A of the lid 14, the attachment frame 40" is snap-fitted into the circumferential groove 14G of the undersurface of the lid 14. The safety cap 20" is thereby attached to the lid 14, and the pressure release valve 16 (or the lower portion 16B having the pressure intake aperture 18) is covered by the safety cap 20".

Figure 10:
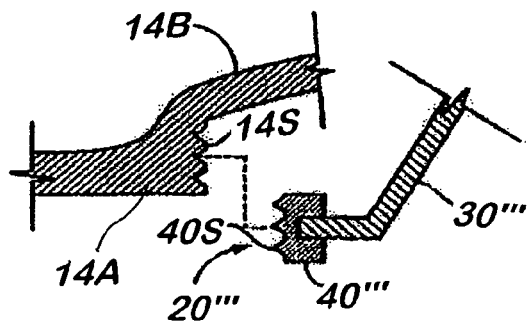
FIG. 10 shows in cross section the detail of how the screw safety cap attaches to the specialized lid chamber in the present invention.

In the structure shown in FIGS. 9 and 10, the safety cap 20'" is comprised of a circular attachment frame 40'" and a mesh casing body 30'", with its circumferential edge secured by the attachment frame 40'". The outer circumferential surface of the circular attachment frame 40'" is made with the external thread 40s. The mesh casing body 30" is made of a wavy mesh plate comprised of numerous flat sections 30C that are connected by numerous ridge portions 30D. The lid 14 of the pressure cooker is formed with an outwardly expanding dome-shaped portion 14b with the pressure release valve 16 at the center; and an internal screw thread 14s is formed in the interior lower edge area of the dome-shaped portion 14b. The inner diameter of the interior lower edge area of the dome-shaped portion 14b of the lid 14 and the outer diameter of the attachment frame 40'" of the safety cap 20'" are the same.

The safety cap 20'" is mounted on the under surface of the lid 14 by screwing the attachment frame 40'" of the safety cap 20'" to the inside of the dome-shaped portion 14b of the lid 14. The lower portion 16B of the pressure release valve 16 is covered by the safety cap 20'", and this prevents the air intake apertures of the pressure release valve 16 from clogging. Because of its dome-shaped portion 14b, the safety cap 20'", and the mesh casing body 30'" that is formed by the wavy mesh plate, which is comprised of the numerous flat sections 30C, avoids contact with the pressure release valve 16.

Due to the ridged portions 30D, food particles are less likely to be caught by the safety cap 20'", but some of them are still caught by the flat sections 30C. The more ridges portions 30D the safety cap 20'" has, the less food particles are caught or trapped by the safety cap 20'"; consequently, the safety cap 20'" prevents itself from clogging and thus efficiently performs its intended function.

Figure 11:
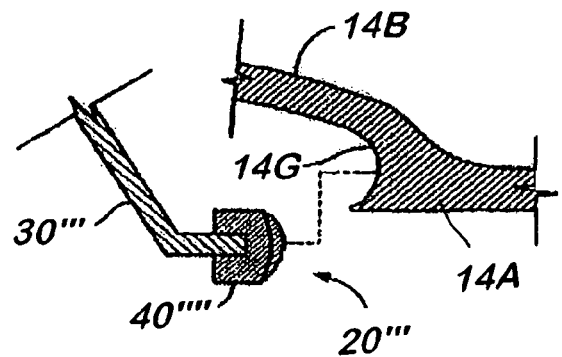
FIG. 11 shows in cross section the detail of how the snap-fit safety cap attaches to the specialized lid chamber in the present invention.

The safety cap 20'" can also be installed by a snap-fit attachment to the specialized lid chamber. More specifically, in the structure shown in FIG. 11, the attachment frame 40"" of the safety cap 20'" is made of an elastic material. Attachment frame 40"" has a curved outer circumferential surface, and an internal circumferential groove 14G which holds the curved outer circumferential surface of the attachment frame 40"" is formed in the internal lower edge area of the ring-shaped ridge 14A of the lid 14. Attachment 40"" fits snugly into the internal lower edge area of the ring-shaped ridge 14A of the lid 14. The attachment frame 40"" of the safety cap 20'" that includes the mesh casing body 30'" has an outer diameter that is the same as the inner diameter of the circumferential groove 14G of the ring-shaped ridge 14A of the lid 14.

By pushing the attachment frame 40"" of the safety cap 20'" into the circumferential groove 14G' of the lid 14, the attachment frame 40"" is snap-fitted into the circumferential groove 14G'. The safety cap 20'" is thereby attached to the lid 14, and the pressure release valve 16 is covered by the safety cap 20'".

In the illustrated structures, the attachment frame 40 (40', 40", 40'", 40"") is in a circular shape; however, it can also take other shapes such as a square, rectangle or oval.

The safety cap 20 (20', 20", 20'") in the figures has a curved surface; however, it can also have a planar surface by making the safety cap 20 (particularly, the mesh casing body 30 (30', 30") in a pyramid or triangular pyramid.

Lastly, by making the attachment frame 40 of the safety cap 20 with a magnetic material, the safety cap 20 can be magnetically mounted to the undersurface of the lid 14. When the attachment frame 40 is made with a magnetic material such as carbon core stainless steel, then screw-mounting or snap-fit mounting are unnecessary.

Figure 12:
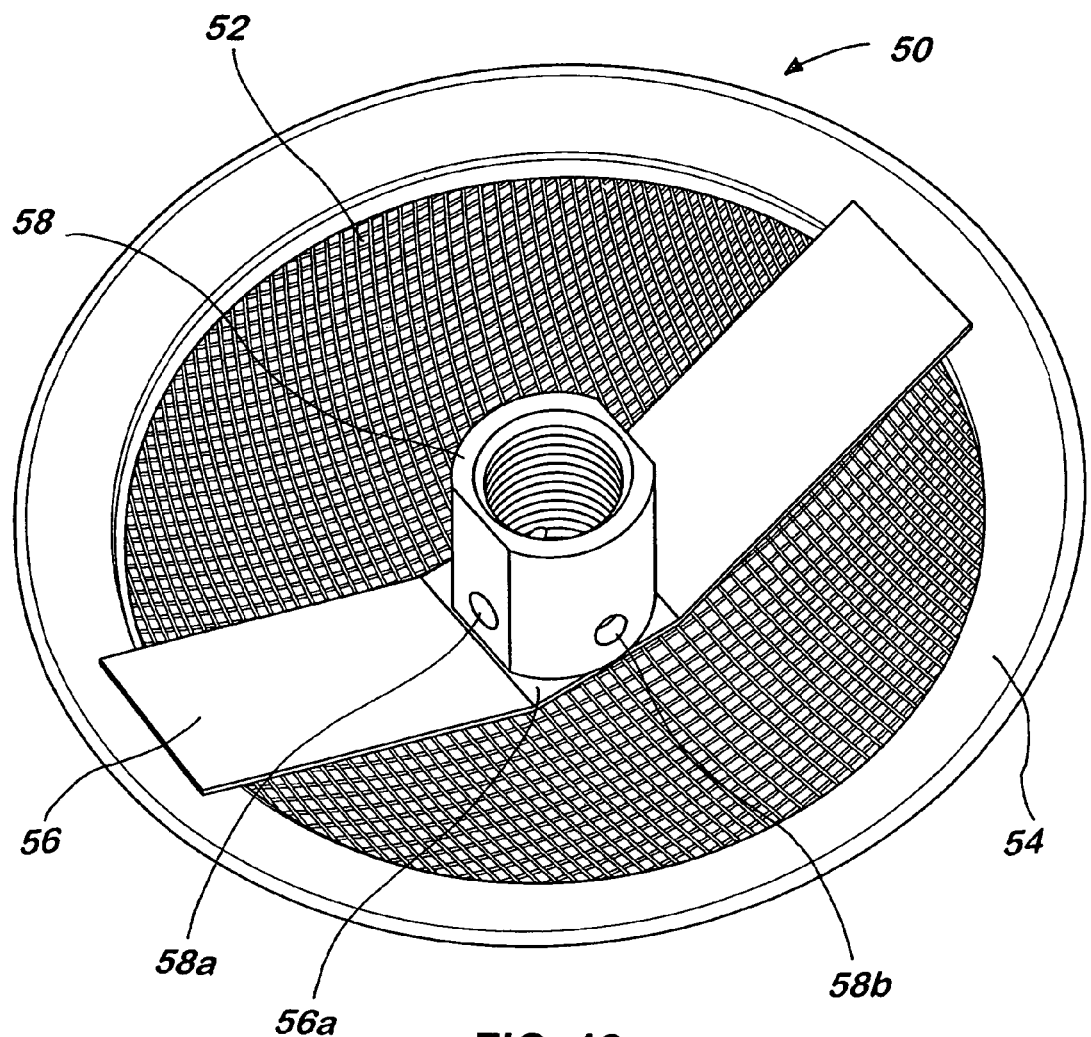
FIG. 12 is a perspective view of a different type of protective device (safety cap) according to the present invention.
Figure 13:
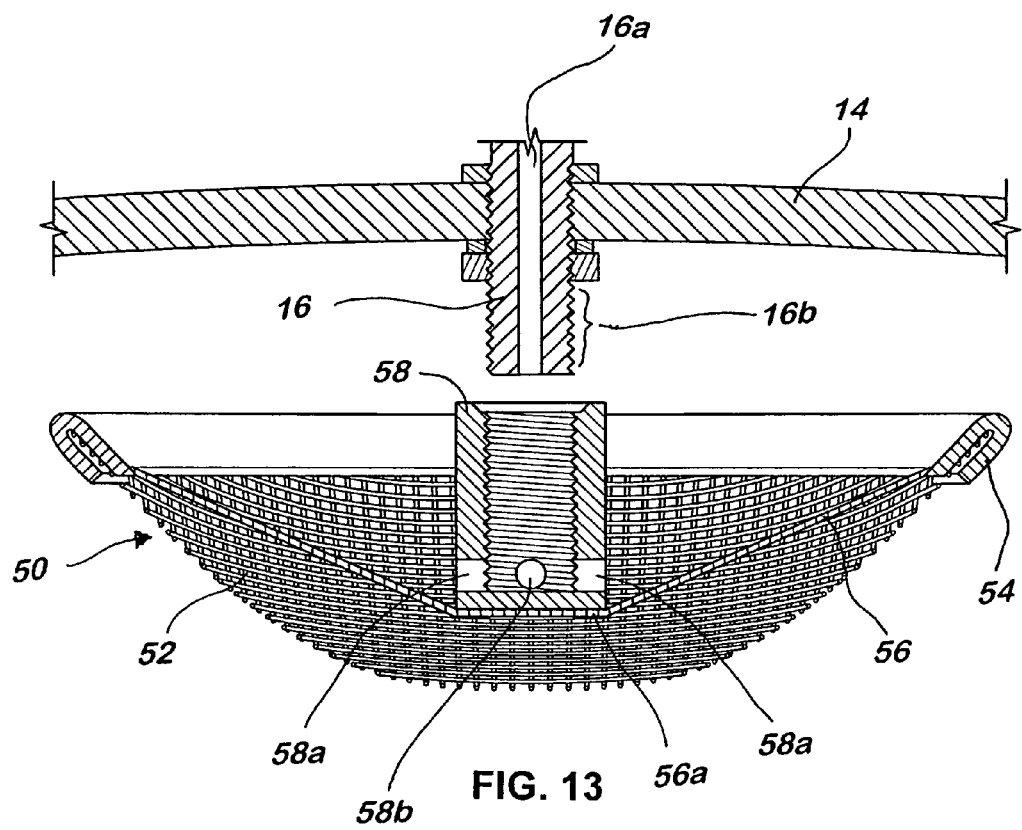
FIG. 13 is a vertical cross-sectional view of the protective device with a part of the lid of a pot shown thereabove.
Figure 14:
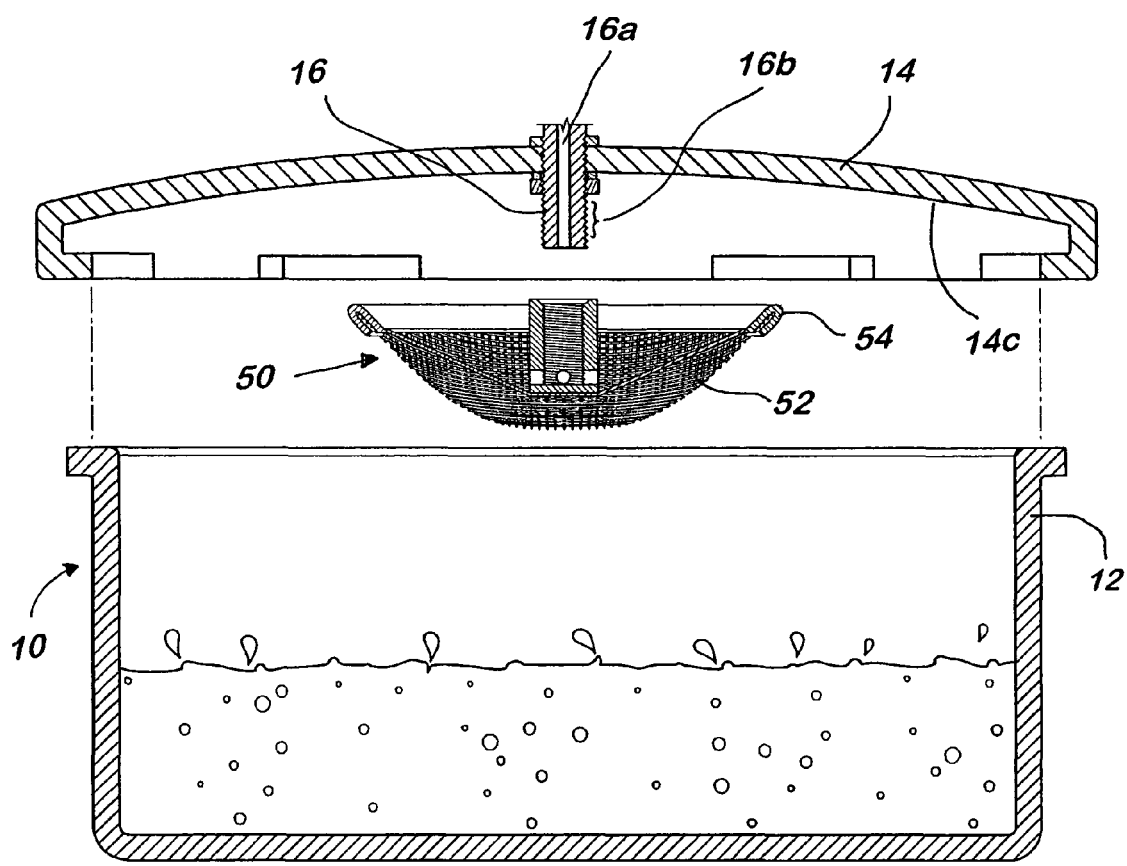
FIG. 14 is a vertical cross-sectional illustration showing the protective device to be installed in a pressure cooker.

FIGS. 12 through 14 show a different type of safety cap from those described above.

This safety cap (protective device) 50 shown in FIG. 12 is comprised of a mesh casing body 52, a ring-shaped reinforcing frame 54, a bridge plate 56, and an attachment member 58.

The mesh casing body 52 is substantially a semi-sphere (dome) shape casing made of mesh and has a hollow interior and a curved outer surface. The ring-shaped reinforcing frame 54 is fixed to the upper edge of the mesh casing body 52, so that it comes into contact with the inner surface of the lid 14 of a pressure cooker 10 when the safety cap 50 is attached (see FIG. 14) to the lower portion of the pressure release valve 16 which is inside the lid 14. The size of the opening of the mesh of the casing body 52 is equal to or smaller than the air passage 16a of the pressure release valve 16.

The bridge plate 56, which is of an elongated rectangular shape made of a thin metal plate of, for instance, stainless-steel, is provided on the reinforcing frame 54 so that it is disposed to diametrically cross the ring-shaped reinforcing frame 54. As seen from FIG. 13, the bridge plate 56 is bent downward or substantially in a flattened shallow U-shape with a horizontal section 56a at the center, and it is fixed to the reinforcing frame 54 at both ends thereof by, for example, welding. The horizontal section 56a of the bridge plate 56 is located vertically at a middle portion with respect to the depth of the mesh casing body 52 so that the horizontal section 56a is not in touch with the bottom of the mesh casing body 52, keeping a distance between the bridge plate 56 and the bottom of the mesh casing body 52, and thus there is a space in between.

To this horizontal section 56a of the bridge plate 56, the attachment member 58 made of, for instance, stainless-steel, is fixed (by welding, for instance) so that it is on the upper surface of the horizontal section 56a. As best seen from FIG. 12, the attachment member 58 is an internally-threaded hollow cylinder; and it is formed, near the bottom edge, with a plurality of air apertures 58a and 58b that are provided at circumferentially equal intervals and communicate with the interior (or with the air passage 16a) of the pressure release valve 16 when the safety cap 50 is fitted to the pressure release valve 16. In the shown structure, four air apertures 58a and 58b are provided; and the two air apertures 58a are provided so that each of the apertures 58a is located within the width of the bridge plate 56; in other words, the apertures 58a open (face) in the direction of the length of the bridge plate 56 and so that they are located above the middle portion (center) in the width direction of the bridge plate 56; and the other two air apertures 58b are provided so that they open (face) in a direction perpendicular to the length of the bridge plate 56. As seen from FIG. 13, the upper edge of the attachment member 58 which is disposed on the horizontal section 56a of the bridge plate 56 is at substantially the same level in height as the upper circumferential edge of the mesh casing body 52 (or of the reinforcing frame 54).

This safety cap 50 structured as described above is attached to the lower portion (see FIG. 14) of the pressure release valve 16 when the internally threaded attachment member 58 is screwed to the external thread 16b of lower portion of the pressure release valve 16. Since the mesh casing body 52 has a curved (convex) outer surface, the mesh casing body 52 spacedly covers the lower portion of the pressure release valve 16 located inside the lid 14, and food particles hardly adhere to the dome-shaped mesh casing body 52. The air passage 16a of the pressure release valve 16 is thus prevented from clogging.

In addition, in the structure of the above-described safety cap 50, the horizontal section 56a at the central portion of the bridge plate 56 is not in touch with the bottom of the mesh casing body 52, and as a result the attachment member 58 provided thereon is also not in touch with the bottom of the mesh casing body 52, and there is a space between the bridge plate 56 or the attachment member 58 and the bottom of the mesh casing body 52. Accordingly, these parts are avoided from rusting and are maintained in good hygiene conditions, and in addition, the air or steam can smoothly flows into the mesh casing body 52 under good circulation.

In addition, since the bridge plate 56 is a meal plate and bent downward to take a flattened V-shape, it provides a spring force, and as a result, the fitting of the mesh casing body 52 to the pressure release valve 16 can be done easily, and the circumferential edge of the ring-shaped reinforcing frame is able to make a tight contact with the under surface of the lid 14.

The bridge plate 56 described above is an elongated rectangular shape; however, it can take a structure in which three (or more) branch portions separated from each other by 120 degrees (or, for instance, 90 degrees when four branch portions are provided) from each other extend out from a central horizontal section 56a, so that the branch portions are fixed (welded) at their three tip ends to the reinforcing frame 54.

Furthermore, the air apertures 58a are provided so that they open (face) in the direction of the length of the bridge plate 56 and so that they are located above the center or the middle portion in the width direction of the bridge plate 56. Accordingly, the air apertures 58a are behind the bridge plate 56 when viewed from the bottom of the mesh casing body 52, and thus they are not directly exposed to the circulation of the air or steam inside the mesh casing body 52, and as a result fluid (such as juice produced during cooking) is less likely to enter the air apertures 58a to clog the air apertures compared to the other air apertures 58b, assuring good air or steam flow into the air passage 16a of the pressure release valve 16, and the safety during cooking (during the use of the safety cap) is improved. In addition, compared to the other structures, particularly to the structure shown in FIG. 5, the number of the parts required is smaller in the safety cap 50, and as a result, the maintenance is easy and the manufacturing cost for the safety cap 50 can be lower as well.

The invention claimed is:

1. A protective device for a pressure release valve in a lid of a pressure cooker, a lower portion of said pressure release valve being located inside said lid, said protective device comprising:
   a mesh casing body with numerous openings, said mesh casing body being of a dome shape,
   a ring-shaped reinforcing frame fixed to an upper edge of said mesh casing body,
   a bridge plate fixed at end portions thereof to said reinforcing frame, keeping a distance between said bridge plate and a bottom of said mesh casing body, said bridge plate comprising an elongated rectangular thin metal plate disposed diametrically across the ring-shaped reinforcing frame, and
   an attachment member of substantially a hollow cylinder provided at a center of said bridge plate, said attachment member to be fitted to said lower portion of said pressure release valve and formed with an air aperture that communicates with an interior of said pressure release valve, a size of each of said openings of said mesh casing body being equal to or smaller than said air aperture of said attachment member;

whereby clogging of said air passage of said pressure release valve is prevented.

2. A protective device for a pressure release valve in a lid of a pressure cooker, a lower portion of said pressure release valve being located inside said lid, said protective device comprising:

a mesh casing body with numerous openings, said mesh casing body being of a dome shape, a ring-shaped reinforcing frame fixed to an upper edge of said mesh casing body, a bridge plate fixed at end portions thereof to said reinforcing frame, keeping a distance between said bridge plate and a bottom of said mesh casing body, and an attachment member of substantially a hollow cylinder provided at a center of said bridge plate, said attachment member to be fitted to said lower portion of said pressure release valve and formed with an air aperture that communicates with an interior of said pressure release valve, a size of each of said openings of said mesh casing body being equal to or smaller than said air aperture of said attachment member; and wherein said bridge plate is substantially a flattened V-shape with a horizontal section at a center thereof on which said attachment member is provided, and a bottom of said attachment member provided on said bridge plate is at substantially vertically midway in a depth of said dome shaped mesh casing body without touching the bottom of said dome shaped casing body;

whereby clogging of said air passage of said pressure release valve is prevented.

3. The protective device according to claim 1, wherein said attachment member is internally threaded so that said attachment member is screw-fitted to said lower portion of said pressure release valve which is externally threaded.

4. A protective device according to claim 1, for a pressure release valve in a lid of a pressure cooker, a lower portion of said pressure release valve being located inside said lid, said protective device comprising:

a mesh casing body with numerous openings, said mesh casing body being of a dome shape, a ring-shaped reinforcing frame fixed to an upper edge of said mesh casing body, a bridge plate fixed at end portions thereof to said reinforcing frame, keeping a distance between said bridge plate and a bottom of said mesh casing body, and an attachment member of substantially a hollow cylinder provided at a center of said bridge plate, said attachment member to be fitted to said lower portion of said pressure release valve and formed with an air aperture that communicates with an interior of said pressure release valve, a size of each of said openings of said mesh casing body being equal to or smaller than said air aperture of said attachment member; and wherein said attachment member provided on said bridge plate is formed with a plurality of air apertures, and at least one of said air apertures is located within a width of said bridge plate;

whereby clogging of said air passage of said pressure release valve is prevented.

5. A pressure cooker comprised of a pot, a fitted lid, and a pressure release valve provided in said lid and having therein an air passage, a lower portion of said pressure release valve being located inside said lid, wherein:

said lower portion of said pressure release valve is cylindrical and formed with an external thread; and a protective device is fitted to said lower portion of said pressure release valve, said protective device being comprised of a mesh casing body with numerous openings, said casing body being of a dome shape and spacedly covers said lower portion of said pressure release valve, a ring-shaped reinforcing frame fixed to an upper edge of said mesh casing body, a bridge plate fixed at end portions thereof to said reinforcing frame, keeping a distance between said bridge plate and a bottom of said mesh casing body, and an attachment member of substantially a hollow cylinder provided at a center of said bridge plate, said attachment member being fitted to said lower portion of said pressure release valve and formed with an air aperture that communicates with said air passage of said pressure release valve, a size of each of said openings of said mesh casing body being equal to or smaller than said air aperture of said attachment member;

whereby clogging of said air passage of said pressure release valve is prevented.

6. The protective device according to claim 5, wherein said bridge plate is provided so as to diametrically cross said ring-shaped reinforcing frame.

7. The pressure cooker according to claim 5, wherein said bridge plate is substantially a flattened V-shape with a flat section at a center thereof on which said attachment member is provided, and a bottom of said attachment member provided on said bridge plate is at substantially vertically midway in a depth of said dome shaped mesh casing body without touching a bottom of said dome shaped casing body.

8. The pressure cooker according to claim 5, wherein said attachment member is internally threaded and screw-fitted to said lower portion of said pressure release valve.

9. The pressure cooker according to claim 5, wherein said attachment member provided on said bridge plate is formed with a plurality of air apertures, and at least one of said air apertures is located within a width of said bridge plate.

* * * * *